United States Patent [19]

Yamamoto et al.

[11] Patent Number: 5,106,912
[45] Date of Patent: Apr. 21, 1992

[54] ANTISTATIC THERMOPLASTIC RESIN COMPOSITION

[75] Inventors: Naoki Yamamoto; Hiroki Hatakeyama, both of Otake, Japan

[73] Assignee: Mitsubishi Rayon Company, Ltd., Tokyo, Japan

[21] Appl. No.: 580,875

[22] Filed: Sep. 11, 1990

[51] Int. Cl.$^5$ .................. C08L 33/14; C08L 41/00
[52] U.S. Cl. .................. 525/212; 524/128; 525/217; 525/221; 525/222; 525/230
[58] Field of Search .............. 525/212, 217, 222, 221, 525/230; 524/128

[56]  References Cited
U.S. PATENT DOCUMENTS

| | | | |
|---|---|---|---|
| 2,707,709 | 5/1955 | Buchdahl et al. | |
| 3,717,689 | 2/1973 | Tanaka et al. | 525/217 |
| 4,861,727 | 8/1989 | Sasaki et al. | 525/217 |

FOREIGN PATENT DOCUMENTS 0676741 7/1966 Belgium .
0257592 3/1988 European Pat. Off. .

OTHER PUBLICATIONS

Patent Abstracts of Japan, vol. 14, No. 535 (C-781) [4478], Nov. 26, 1990; & JP-A-2 225 536 (Mitsubishi Rayon) Jul. 9, 1990 *The Whole Abstract*.
Patent Abstracts of Japan, vol. 14, No. 318 (C-738) [4261], Jul. 9, 1990; & JP-A-2 110 141 (Teijin) Apr. 23, 1990 *The Whole Abstract*.
Chemical Patents Index, week 9006, Apr. 4, 1990, accession No. 90-040901, Derwent Publications Ltd., London, GB; & JP-A-1 318 016 (Nitto Denko( Dec. 22, 1989.

*Primary Examiner*—Jacob Ziegler
*Attorney, Agent, or Firm*—Oblon, Spivak, McClelland, Maier & Neustadt

[57] ABSTRACT

Disclosed is an antistatic thermoplastic resin composition comprised of (A) 100 wt.parts of a thermoplastic resin and (B) 0.1–40 wt.parts of a polymer comprising 20–100 wt. % of units an anionic monomer represented by the formula (I):

$$CH_2=\underset{\underset{R_1}{|}}{C}-A_1-SO_3{}^-X^+R_2R_3R_4R_5 \quad (I)$$

wherein $R_1$ is H or $-CH_3$, $A_1$ is $$-(CH_2)_n-$$

in which n is 0, 1 or 2, $$-\underset{\underset{O}{\|}}{C}-O-B-$$

in which B is an alkylene, arylene or aralkylene group which may have an ester bond, or $$-\underset{\underset{O}{\|}}{C}-\underset{\underset{R_6}{|}}{N}-B-$$

in which B is as defined above and $R_6$ is H or an alkyl group, or $A_1$ is

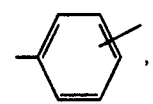

X is N or P, and $R_2$, $R_3$, $R_4$ and $R_5$ independently represent an alkyl, aryl or aralkyl group may have a substituent, and 80–0 wt. % of units of a copolymerizable vinyl or vinylidene monomer.

16 Claims, No Drawings

ANTISTATIC THERMOPLASTIC RESIN COMPOSITION

BACKGROUND OF THE INVENTION

1. Field of the Invention

The present invention relates to a thermoplastic resin composition having a good and durable antistatic property.

2. Description of the Related Art

In general, plastics have a large electric resistance value and are readily charged by friction, peeling or the like, and thus attract dust and dirt which spoil the appearance thereof, and accordingly, various problems arise in the fields of molded articles, films, sheets, fibers and the like.

As the means for imparting an antistatic property to plastics, the following two methods are generally adopted.

(1) Internal kneading of an antistatic agent.
(2) Surface coating with an antistatic agent.

Furthermore, there can be mentioned a method of surface coating with a silicon compound, and a method of a modification of the surface structure of plastics, i.e., a plasma treatment method, but these methods are expensive.

A low-molecular-weight surface active agent is generally used in the method of internal kneading of an antistatic agent, but according to this method, it is difficult to impart a durable antistatic property, and if the antistatic agent present on the surface is removed by water washing, rubbing or the like, the antistatic property is lost. A method using an antistatic rubber is proposed in Japanese Unexamined Patent Publication No. 55-36237, but, in this method, the antistatic rubber must be incorporated in a large amount, resulting in a reduction of the inherent properties of the plastics, such as a high heat resistance, and the surface resistance value is at best about $10^{11}\, \Omega$.

The method of surface coating an antistatic agent gives a good antistatic property, such as a surface resistance value of about $10^9\, \Omega$, but this antistatic property is easily lost by water washing, rubbing or the like. Furthermore, unlike the internal kneading method, this method requires a surface coating step, resulting in an increase of the manufacturing cost.

The inventors previously proposed an antistatic thermoplastic resin composition formed by incorporating a cationic copolymer having a quaternary ammonium salt into a thermoplastic resin (Japanese Patent Application No. 61-196858), but when molded at a high temperature of higher than 220° C., this thermoplastic resin composition is discolored and becomes a light yellow while the composition remains in a molding machine.

An antistatic material having a high reliability is required for a container or package for electronic parts, but as pointed out hereinbefore, an antistatic agent capable of providing a good and durable antistatic property when used in a small amount without a special step, which does not lower inherent properties of the base polymer, is not known, and the development of such an antistatic agent is urgently required.

SUMMARY OF THE INVENTION

The primary object of the present invention is to provide a thermoplastic resin composition having a good and durable antistatic property, without a substantial reduction of the heat resistance of the base thermoplastic polymer.

In accordance with the present invention, there is provided a antistatic thermoplastic resin composition comprising (A) 100 parts by weight of a thermoplastic resin and (B) 0.1 to 40 parts by weight of a homopolymer or copolymer comprising 20 to 100% by weight of units derived from an anionic monomer represented by the following general formula (I):

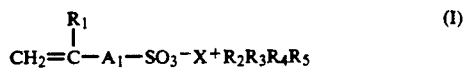

wherein $R_1$ represents a hydrogen atom or a methyl group, $A_1$ represents

in which n is 0 or an integer of 1 or 2,

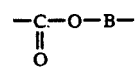

in which B represents an alkylene, arylene or aralkylene group having 1 to 18 carbon atoms which may have an ester bond, or

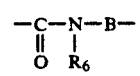

in which B is as defined above and $R_6$ represents a hydrogen atom or an alkyl group having 1 to 5 carbon atoms, or $A_1$ is

X represents a nitrogen atom or a phosphorus atom, and $R_2$, $R_3$, $R_4$ and $R_5$ independently represent an alkyl, aryl or aralkyl group having 1 to 18 carbon atoms which may have a substituent, and 80 to 0% by weight of units derived from a vinyl monomer or vinylidene monomer copolymerizable with the anionic monomer.

This antistatic thermoplastic resin composition is advantageous when compared to the above-mentioned composition previously proposed by the inventors, in that the composition has a much higher resistance to thermal deterioration, and at the molding step conducted at a high temperature such as about 250° C., discoloration does not substantially occur even if the composition remains in a molding machine.

DESCRIPTION OF THE PREFERRED EMBODIMENTS

As the thermoplastic resin (A) used as the base polymer in the present invention, there can be mentioned, for example, (a) homopolymers and copolymers of at least one ethylenically unsaturated monomer and copolymers thereof, such as polyethylene, polypropylene and polymethylpentene, polyvinyl chloride, polyvinyl acetate, an ethylene/vinyl acetate copolymer, an ethylene/ethyl acrylate copolymer, an ethylenic ionomer resin, a methyl methacrylate polymer, polystyrene, a styrene/acrylonitrile copolymer, a styrene/alkyl (meth)acrylate copolymer, rubber-modified polystyrene, an ABS resin, an MBS resin and an AAS resin, (b) polymers of at least one bifunctional reactive compound polymerizable by self-condensation, such as polyoxymethylene, a polyacetal copolymer, polyphenylene ether, a PPS resin, polycaprolactam and polycaprolactone, and (c) polymers of at least two bifunctional reactive compounds polymerizable by polycondensation, such as nylon-66, a polysulfone, a polyester, a polyester/polyether block copolymer, a polyester/polyamide block copolymer, a polyimide, an aromatic polyester, a polycarbonate, a polyether ether ketone and a polyurethane elastomer. These polymers can be used alone or as a mixture of two or more thereof.

Among these polymers, polystyrene, a styrene/acrylonitrile copolymer, an ABS resin, a methyl methacrylate polymer, a polyethylene terephthalate polymer, and polyvinyl chloride are preferably used.

Comonomer components are generally introduced into these polymers, to improve the physical properties thereof such as shapability and heat resistance, and thermoplastic resins (A) having such comonomer components introduced therein also can be used in the present invention, although the thermoplastic resin (A) used in the present invention is not limited by the kind of comonomer component.

For example, the methyl methacrylate polymer preferably used in the present invention is a polymer comprising 50 to 100% by weight of methyl methacrylate units and 0 to 50% by weight of other copolymerizable monomer. As the monomer copolymerizable with methyl methacrylate, there can be mentioned alkyl methacrylates such as ethyl methacrylate, butyl methacrylate and 2-ethylhexyl methacrylate, alkyl acrylates such as methyl acrylate, ethyl acrylate, butyl acrylate and 2-ethylhexyl acrylate, and styrene, acrylonitrile, methacrylic acid, acrylic acid, itaconic acid, maleic acid, fumaric acid and vinyltoluene. Alkyl acrylates such as methyl acrylate, and styrene are preferably used.

The anionic monomer constituting the units of the homopolymer or copolymer (B) used as the antistatic property-imparting component in the present invention is represented by the following general formula (I):

$$CH_2=C-A_1-SO_3^-X^+R_2R_3R_4R_5 \quad (I)$$
$$|$$
$$R_1$$

wherein $R_1$ through $R_5$, X and $A_1$ are as defined above. As specific examples of the anionic monomer represented by general formula (I), there can be mentioned tetramethylammonium vinylsulfonate, benzyltrimethylammonium vinylsulfonate, tetraethylammonium allylsulfonate, benzyltriethylammonium methallylsulfonate, methyltriethylolammonium sulfoethylmethacrylate, lauryltrimethylammonium sulfoethylacrylate, tetramethylammonium sulfoethylacrylate, tetramethylammonium 2-acrylamido-2-methylpropanesulfonate, methyltriethylammonium 2-methacrylamido-2-methylpropanesulfonate, methyltriethylolammonium styrenesulfonate/ethylene oxide adduct, tetrabutylammonium α-methylstyrenesulfonate, tetraethylphosphonium vinylsulfonate, tetrabutylphosphonium vinylsulfonate, tetramethylolphosphonium vinylsulfonate, tetrabutylphosphonium allylsulfonate, tetralaurylphosphonium methallylsulfonate, tributylmethylphosphonium sulfoethylmethacrylate, triethylbutylphosphonium sulfoethylacrylate, tetrabutylphosphonium sulfopropylacrylamide, trimethylbutylphosphonium sulfopropylmethacrylamide, tetrabutylphosphonium styrenesulfonate, tetramethylolphosphonium styrenesulfonate and triethylmethylphosphonium α-methylstyrenesulfonate.

When a compound of general formula (I) in which at least one of $R_2$ through $R_5$ is a hydrogen atom is used, the resistance to thermal deterioration is lowered and the composition is often discolored at the shaping step.

An appropriate anionic monomer is selected according to the kind of thermoplastic resin (A). For example, if the thermoplastic resin (A) is a methyl methacrylate polymer, in view of the maintenance of the transparency of the methyl methacrylate polymer and the availability of the starting material, ammonium and phosphonium salts of 2-acrylamido-2-methylpropanesulfonic acid and ammonium and phosphonium salts of styrenesulfonic acid, especially tetramethylammonium salts, are preferably used.

In the homopolymer or copolymer (B) used as the antistatic property-imparting component in the present invention, the content of units of the anionic monomer is 20 to 100% by weight, and the content of units of the copolymerizable vinyl monomer or vinylidene monomer as the other monomer is 80 to 0% by weight.

As the copolymerizable vinyl monomer or vinylidene monomer, there can be mentioned acrylic acid, methacrylic acid, alkyl acrylates, alkyl methacrylates, acrylamide, methacrylamide, vinyl acetate, unsaturated nitrile compounds, aromatic vinyl compounds, alkyl vinyl ethers, alkyl vinyl ketones, 2-hydroxyalkyl acrylates, 2-hydroxyalkyl methacrylate, vinyl chloride, vinylidene chloride, isobutene, 2-acid-phosphoxyethyl acrylate, and 2-acid-phosphoxyethyl methacrylate. These monomers can be used alone or as a mixture of two or more thereof.

If the units of the copolymerizable vinyl monomer or vinylidene monomer are the same as units of the monomer constituting the thermoplastic resin (A) as the base polymer or the same as units of a monomer constituting a resin having a good compatibility with the thermoplastic resin (A), the physical properties of the base polymer, such as strength and transparency, can be advantageously maintained.

A monomer having a polyalkylene glycol component is especially preferably used as the comonomer component in the present invention. This monomer shows an effect of improving the antistatic property in various thermoplastic resins (A) without a reduction of the physical properties such as strength and transparency. Especially, when the thermoplastic resin (A) is a methyl methacrylate polymer, if this monomer is used, there can be provided a thermoplastic resin composition having an excellent antistatic property and transparency.

As the copolymerizable monomer having a polyalkylene glycol component, which is used in the present invention, there can be mentioned styryl-terminated polyalkylene glycol macromers and vinyl-terminated polyalkylene glycol macromers. Especially preferable monomers are represented by the following general formula (II):

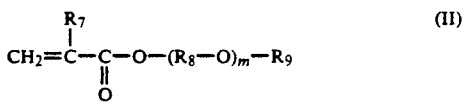

(II)

wherein $R_7$ represents a hydrogen atom or a methyl group, $R_8$ represents an alkylene group having 1 to 4 carbon atoms, which may be branched, $R_9$ represents a hydrogen atom or an alkyl group having 1 to 20 carbon atoms, and m is an integer of from 1 to 500.

These monomers are methacrylate- or acrylate-terminated polyalkylene glycol macromers. As specific examples, there can be mentioned polyethylene glycol (4) monomethacrylate, polyethylene glycol (23) monomethacrylate, polyethylene glycol (300) monomethacrylate, polyethylene glycol (23) monoacylate, polypropylene glycol (23) monomethacrylate, polypropylene glycol (23) monoacrylate, polyethylene glycol (23) monomethacrylate monomethyl ether, polyethylene glycol (23) monomethacrylate monobutyl ether, polypropylene glycol (23) monoacrylate monomethyl ether, polyethylene glycol (23) monomethacrylate monononyl ether, polyethylene glycol (23) monomethacrylate monostearyl ether, polypropylene glycol (23) monomethacrylate monomethyl ether, polyethylene glycol (4) monomethacrylate monomethyl ether, polyethylene glycol (9) monomethacrylate monomethyl ether, polyethylene glycol (300) monomethacrylate monomethyl ether, and polyethylene glycol (23) monomethacrylate mono-oleyl ether. Note, each parenthesized number indicates the number of units of the polyalkylene glycol.

The homopolymer or copolymer (B) used in the present invention comprises 20 to 100% by weight of the units derived from the anionic monomer represented by general formula (I) and 80 to 0% by weight of the units derived from the copolymerizable vinyl monomer or vinylidene monomer. If the content of the units of the monomer (I) having a quaternary ammonium salt group or quaternary phosphonium salt group in the copolymer (B) is lower than 20% by weight, a good antistatic property cannot be given to the thermoplastic resin (A). When the thermoplastic resin (A) is a methyl methacrylate polymer, a copolymer comprising 20 to 90% by weight, especially 30 to 80% by weight, of the anionic monomer represented by general formula (I), 10 to 80% by weight, especially 20 to 70% by weight, of the copolymerizable monomer having a polyalkylene glycol component and 0 to 70% by weight, especially 0 to 50% by weight, of the copolymerizable vinyl monomer or vinylidene monomer, is preferably used as the copolymer (B). If the content of the monomer having a polyalkylene glycol component in the copolymer (B) is lower than 10% by weight, the transparency of the final resin composition becomes poor.

If the copolymerizable vinyl monomer or vinylidene monomer as the third component has a good compatibility with the methyl methacrylate polymer, even when the content of the monomer having a polyalkylene glycol component is reduced, a high transparency can be maintained in the obtained resin composition. Furthermore, where the copolymerizable vinyl monomer or vinylidene monomer has a high polarity, even if the content of the anionic monomer having a quaternary ammonium base or quaternary phosphonium base is reduced, a high antistatic property can usually be maintained in the obtained resin composition.

Where the thermoplastic resin (A) is a methyl methacrylate polymer, the weight ratio of the units derived from the anionic monomer of formula (I) to the units derived from the monomer of formula (II) having a polyalkylene glycol component in the copolymer (B) is preferably in the range of from ¼ to 4/1, more preferably in the range of ½ to 2/1. An optimum value of this weight ratio is greatly changed according to the kinds of the monomers of formulae (I) and (II) and the kind and amount of the copolymerizable vinyl monomer or vinylidene monomer to be further included in the copolymer (B). In general, if the weight of the units derived from the monomer of formula (I) is more than 4 times the weight of the units derived from the monomer of formula (II), the transparency tends to become lower. In contrast, if the weight of the units derived from the monomer of formula (I) is smaller than ¼ of the weight of the units of the monomer of formula (II), the antistatic property tends to become poor.

The process for the preparation of the copolymer (B) is not particularly critical, and in general, such means as the solution polymerization or bulk polymerization, wherein a radical-generating initiator and a chain transfer agent are used, can be adopted, but the solution polymerization is preferably adopted because the polymerization can be advanced while maintaining the homogeneous system. In the case of the solution polymerization, there can be adopted various methods for the addition of the monomers, for example, a collective addition, divided addition, and dropwise addition.

Preferably, the number average molecular weight of the homopolymer or copolymer (B) is at least 1,000. If the molecular weight of the homopolymer or copolymer (B) is lower than 1,000, sometimes a good and durable antistatic property cannot be obtained, and a tendency toward a lowering of the heat resistance of the thermoplastic resin as the base polymer is observed.

The homopolymer or copolymer (B) is incorporated in an amount of 0.1 to 40 parts by weight, preferably 0.5 to 40 parts by weight, per 100 parts by weight of the thermoplastic resin (A). If the amount of the homopolymer or copolymer (B) is smaller than 0.1 part by weight per 100 parts by weight of the thermoplastic resin (A), a good antistatic property cannot be given to the final resin composition. If the amount of the homopolymer or copolymer (B) is larger than 40 parts by weight per 100 parts by weight of the thermoplastic resin (A), the inherent physical properties of the thermoplastic resin (A) as the base polymer are greatly lowered and the cost increased. In general, it is sufficient if the homopolymer or copolymer (B) is incorporated in an amount of about 2 to about 6 parts by weight per 100 parts by weight of the thermoplastic resin (A), and in this case, the surface resistance value is $10^9$ to $10^{12}$ $\Omega$.

Various methods can be adopted for preparing the composition of the present invention which comprises the thermoplastic resin (A) and the homopolymer or copolymer (B). For example, there can be mentioned a method in which the bulk polymerization for the thermoplastic resin (A) is carried out in the presence of the homopolymer or copolymer (B), and a method in which the homopolymer or copolymer (B) and the thermoplastic resin (A) are mixed together in the molten state at a high temperature. The latter method is preferably adopted, but where a molded article is directly obtained by the cast polymerization or the like, the former method is advantageously adopted.

Various shaping methods can be adopted for shaping the resin composition of the present invention having an excellent antistatic property. Heat-melt shaping, for example, injection molding, extrusion molding or press molding is preferable and injection molding is most preferable.

The reason why the thermoplastic resin composition of the present invention shows an antistatic effect is that, because of the peculiar properties of the homopolymer or copolymer (B) comprising units derived from the anionic monomer represented by general formula (I), at the molding step, for example, at the injection molding or extrusion molding, the homopolymer or copolymer (B) is concentrated or oriented to the surface of the molded article. Moreover, since the homopolymer or copolymer (B) is high polymeric substance, the homopolymer or copolymer (B) is not easily dropped even if the molded article obtained from the composition is washed with water, and thus a durable antistatic property can be imparted. Still further, since the compatibility or incompatibility of the homopolymer or copolymer (B) with the base polymer can be easily controlled, the intended antistatic property can be manifested without a reduction of the various inherent properties of the base polymer.

Other antistatic agents, lubricants, antioxidants, ultraviolet absorbers and other additives can be further incorporated in the thermoplastic resin composition of the present invention.

A hindered phenol type antioxidant, a thioether type antioxidant, and a phosphite type antioxidant are generally known. The former two antioxidants have little in the thermoplastic resin composition of the present invention, and a phosphite type antioxidant is preferably used. By using the phosphite type antioxidant, the resistance against a thermal deterioration in the composition of the present invention can be further improved.

The present invention will now be described in detail with reference to the following examples, in which all of "parts" are by weight. In the following examples and comparative examples, the treatments and evaluations of the physical properties were carried out under the following conditions.

Moisture Conditioning

A pellet was injection-molded into a plate of 10 cm × 10 cm × 2 mm, and the moisture conditioning was carried out at a temperature of 20° C. and a relative humidity of 65% for 1 day.

Water Washing Treatment

A test piece for the measurement was strongly rubbed with cotton gauze 30 times under running water.

Surface Resistance Value

A voltage of 500 V was applied to a sample for 1 minute under conditions of a temperature of 20° C. and a relative humidity of 65%, and then the surface resistance value ($\Omega$) was measured by using a high megohm meter (Model TR-8601 supplied by Takeda-Riken).

Charge Half-Value Time

The measurement was carried out under conditions of an applied voltage of 10,000 V, a sample rotation speed of 1300 rpm, an application time of 30 seconds, a temperature of 20° C., and a relative humidity of 65% by using a static honest meter (supplied by Shishido Shokai), and after the application of voltage is stopped, the time required for the sample voltage to fall from the initial voltage to $\frac{1}{2}$ thereof was determined as the charge half-value time (seconds). If this charge half-value time was longer than 2 minutes, the charge half-value time is indicated by a mark "$\infty$".

Heat Distortion Temperature (HDT)

A test piece for the measurement of HDT was prepared according to ASTM D-648, and the test piece was annealed and HDT (°C.) was measured according to ASTM D-648.

Transparency

The haze value was measured by using an integrating sphere haze meter (Model SEP-H-SS supplied by Nippon Seimitsu Kogaku).

EXAMPLE 1

A 3-liter glass flask equipped with stirring vanes was charged with 624.9 parts of 2-acrylamido-2-methylpropanesulfonic acid and 450 parts of methanol, and 1100.6 parts of a 25% solution of tetramethylammonium hydroxide in methanol was added dropwise with violent stirring so that the temperature was maintained below 30° C. After the dropwise addition, the mixture was stirred for 30 minutes to obtain a solution of an anionic monomer (M-1), 4 parts of azobisisobutyronitrile and 2 parts of n-octylmercaptan were then added to the anionic monomer (M-1) solution, and a polymerization was carried out at 60° C. for 4 hours in a nitrogen atmosphere. The polymerization reaction mixture was directly vacuum-dried to obtain an antistatic property-imparting polymer(T-1).

In 100 parts of a polystyrene resin were incorporated 3 parts of the antistatic property-imparting polymer(T-1) and 0.05 part of triphenyl phosphite, and the obtained resin composition was pelletized by an extruder.

The obtained pellet was injection-molded into a plate having a size of 10 cm × 10 cm × 2 mm, a moisture conditioning was carried out at a temperature of 20° C. and a relative humidity of 65% for 1 day, and the antistatic property was evaluated. It was found that the surface resistivity was $5.1 \times 10^{11}$ $\Omega$ and the charge half-value time was 2 seconds.

The obtained plate was subjected to the water washing treatment and the antistatic property thereof was immediately evaluated. It was found that the surface resistivity was $4.8 \times 10^{11}$ $\Omega$ and the charge half-value time was 2 seconds.

EXAMPLE 2

A glass flask equipped with stirring vanes was charged with 624.9 parts of 2-acrylamido-2-methylpropanesulfonic acid and 450 parts of methanol, and 2086.0 parts of a 40% solution of tetrabutylphosphonium hydroxide in methanol was added dropwise with violent stirring so that the temperature was maintained below 30° C. After the dropwise addition, the mixture was stirred for 30 minutes to obtain a solution of an anionic monomer(M-2), 4 parts of azobisisobutyronitrile and 2 parts of n-octylmercaptan were then added to the anionic monomer(M-2) solution, and a polymerization was carried out at 60° C. for 4 hours in a nitrogen atmosphere. The polymerization reaction mixture was directly vacuum-dried to obtain an antistatic property-imparting polymer(T-2).

In 100 parts of a polystyrene resin were incorporated 3 parts of the antistatic property-imparting polymer and 0.05 part of triphenyl phosphite, and the obtained resin composition was pelletized by an extruder.

The obtained pellet was injection-molded into a plate having a size of 10 cm × 10 cm × 2 mm, a moisture conditioning was carried out at a temperature of 20° C. and a relative humidity of 65% for 1 day, and the antistatic property was evaluated. It was found that the surface resistivity was $9.3 \times 10^{11}$ Ω and the charge half-value time was 2 seconds.

The obtained plate was subjected to the water washing treatment and the antistatic property thereof was immediately evaluated. It was found that the surface resistivity was $8.7 \times 10^{11}$ Ω and the charge half-value time was 2 seconds.

EXAMPLE 3

A 3-liter glass flask equipped with stirring blades was charged with 312.4 parts of 2-acrylamido-2-methylpropanesulfonic acid and 450 parts of methanol, and 550.3 parts of a 25% solution of tetramethylammonium hydroxide in methanol was added dropwise with violent stirring so that the temperature was maintained below 30° C. After the dropwise addition, the mixture was stirred for 30 minutes to obtain a solution of an anionic monomer(M-1), 4 parts of azobisisobutyronitrile, 3 parts of n-octylmercaptan, 38 parts of methanol and 450 parts of polyethylene glycol(23) monomethacrylate monomethyl ether were then added to the anionic monomer(M-1) solution, and a polymerization was carried out at 60° C. for 4 hours in a nitrogen atmosphere. The polymerization reaction mixture was directly vacuum-dried to obtain an antistatic property-imparting polymer(T-3).

In 100 parts of a methyl methacrylate polymer were incorporated 6 parts of the antistatic property-imparting polymer(T-3) and 0.05 part of triphenyl phosphite; and the obtained resin composition was pelletized by an extruder.

The obtained pellet was injection-molded into a plate having a size of 10 cm × 10 cm × 2 mm, a moisture conditioning was carried out at a temperature of 20° C. and a relative humidity of 65% for 1 day, and the antistatic property and transparency were evaluated. It was found that the surface resistivity was $3.5 \times 10^{10}$ Ω, the charge half-value time was 1 second, and the haze value was 1.0%.

The obtained plate was subjected to the water washing treatment and the antistatic property thereof was immediately evaluated. It was found that the surface resistivity was $2.5 \times 10^{10}$ Ω and the charge half-value time was shorter than 1 second.

A test piece for the measurement of HDT was prepared according to ASTM D-648, the test piece was annealed, and the HDT was measured. It was found that the HDT was 100° C.

EXAMPLE 4

A 3-liter glass flask equipped with stirring blades was charged with 312.4 parts of 2-acrylamido-2-methylpropanesulfonic acid and 450 parts of methanol, and 1042.8 parts of a 40% solution of tetrabutylphosphonium hydroxide in methanol was added dropwise with violent stirring so that the temperature was maintained below 30° C. After the dropwise addition, the mixture was stirred for 30 minutes to obtain a solution of an anionic monomer(M-2), 4 parts of azobisisobutyronitrile, 3 parts of n-octylmercaptan, 200 parts of methanol and 702 parts of polyethylene glycol(23) monomethacrylate monomethyl ether were then added to the anionic monomer(M-2) solution, and a polymerization was carried out at 60° C. for 4 hours in a nitrogen atmosphere. The polymerization reaction mixture was directly vacuum-dried to obtain an antistatic property-imparting polymer(T-4).

In 100 parts of a methyl methacrylate polymer were incorporated 6 parts of the antistatic property-imparting polymer(T-4) and 0.05 part of triphenyl phosphite, and the obtained resin composition was pelletized by an extruder.

The obtained pellet was injection-molded into a plate having a size of 10 cm × 10 cm × 2 mm, a moisture conditioning was carried out at a temperature of 20° C. and a relative humidity of 65% for 1 day, and the antistatic property and transparency were evaluated. It was found that the surface resistivity was $2.1 \times 10^{11}$ Ω, the charge half-value time was 1 second, and the haze value was 1.0%.

The obtained plate was subjected to the water washing treatment and the antistatic property thereof was immediately evaluated. It was found that the surface resistivity was $1.2 \times 10^{11}$ Ω and the charge half-value time was shorter than 1 second.

A test piece for the measurement of HDT was prepared according to ASTM D-648, the test piece was annealed, and the HDT was measured. It was found that the HDT was 100° C.

EXAMPLES 5 THROUGH 8

In 100 parts of a methyl methacrylate polymer was incorporated 1 to 30 parts of the antistatic property-imparting copolymer(T-3) obtained in Example 3, and a plate having a size of 10 cm × 10 cm × 2 mm was prepared by extruding and molding the resin composition under the same conditions as described in Example 3. Moisture conditioning was carried out at a temperature of 20° C. and a relative humidity of 65% for 1 day, and the antistatic property and other properties of the plate were evaluated. The results are shown in Table 1.

TABLE 1

| Example No. | Amount of copolymer (B) (parts) | Surface resistance value (Ω) | Charge half-value time (seconds) | Surface resistance value after water washing treatment (Ω) | Haze value (%) | HDT (°C.) |
| --- | --- | --- | --- | --- | --- | --- |
| 5 | 1 | $8.5 \times 10^{13}$ | 22.3 | $7.2 \times 10^{13}$ | <1 | 100 |
| 6 | 9 | $1.5 \times 10^9$ | <1 | $2.2 \times 10^9$ | 2.5 | 98 |
| 7 | 12 | $<10^9$ | <1 | $<10^9$ | 5.2 | 97 |

TABLE 1-continued

| Example No. | Amount of copolymer (B) (parts) | Surface resistance value ($\Omega$) | Charge half-value time (seconds) | Surface resistance value after water washing treatment ($\Omega$) | Haze value (%) | HDT (°C.) |
| --- | --- | --- | --- | --- | --- | --- |
| 8 | 30 | $<10^9$ | <1 | $<10^9$ | 8.7 | 94 |

EXAMPLES 9 THROUGH 21

Various monomers were prepared in the same manner as described in Example 1 except that sulfonic acid-containing monomers and quaternary ammonium base shown in Table 2 were used.

TABLE 2

| Monomer No. | Sulfonic acid-containing monomer | Quaternary ammonium base |
| --- | --- | --- |
| M-3 | Allylsulfonic acid | Tetramethylammonium hydroxide |
| M-4 | Sulfoethyl methacrylate | Lauryltrimethylammonium hydroxide |
| M-5 | Styrenesulfonic acid | Benzyltrimethylammonium hydroxide |

By using monomers M-1 and M-3 through M-5, various antistatic property-imparting copolymers(T-5 through T-13) were prepared in the same manner as described in Example 3, except that the kinds of the copolymerized monomers and the copolymerization amounts were changed as shown in Table 3.

TABLE 3

| Antistatic property-imparting polymer No. | Sulfonic acid-containing monomer | | Copolymerized monomer | | Copolymerized monomer | |
| --- | --- | --- | --- | --- | --- | --- |
| | Kind | Copolymerization amount (%) | Kind | Copolymerization amount (%) | Kind | Copolymerization amount (%) |
| T-5 | M-3 | 50 | E23AM | 50 | — | — |
| T-6 | M-4 | 50 | MMA | 50 | — | — |
| T-7 | M-5 | 50 | Styrene | 50 | — | — |
| T-8 | M-1 | 20 | E9MAM | 80 | — | — |
| T-9 | M-1 | 34 | E23MAM | 66 | — | — |
| T-10 | M-1 | 66 | E23MAM | 34 | — | — |
| T-11 | M-1 | 80 | E500MA | 20 | — | — |
| T-12 | M-1 | 40 | E23MAM | 40 | MMA | 20 |
| T-13 | M-1 | 50 | E23MAM | 30 | Styrene | 20 |

Note
E23MAM: polyethylene glycol (23) monomethacrylate monomethyl ether
E9MAM: polyethylene glycol (9) monomethacrylate monomethyl ether
E500MA: polyethylene glycol (500) monomethacrylate
E23AM: polyethylene glycol (23) monoacrylate monomethyl ether
MMA: methyl methacrylate Each parenthesized number indicates the number of ethylene glycol units.

The obtained antistatic property-imparting polymer (antistatic polymer) in an amount shown in Table 4 was mixed with 100 parts of a thermoplastic resin shown in Table 4, the resin composition was pelletized by an extruder under the same conditions as described in Example 1, and the pellet was injection-molded to a plate having a size of 10 cm × 10 cm × 2 mm. Moisture conditioning was carried out at a temperature of 20° C. and a relative humidity of 65% for 1 day, and the antistatic property and other properties were evaluated. With respect to methyl methacrylate polymer (PMMA) resins, the transparency was also evaluated. The results are shown in Table 4.

TABLE 4

| Example No. | Kind of thermoplastic resin (A) | Copolymer (B) | | Surface resistance value ($\Omega$) | Charge half-value time (seconds) | Surface resistance value after water washing treatment ($\Omega$) | HDT (°C.) | Haze value (%) |
| --- | --- | --- | --- | --- | --- | --- | --- | --- |
| | | Kind | Amount (parts) | | | | | |
| 9 | PET | T-5 | 6 | $3.2 \times 10^{11}$ | 1.7 | $2.8 \times 10^{11}$ | — | — |
| 10 | PVC | T-6 | 5 | $2.5 \times 10^{10}$ | <1 | $5.3 \times 10^{10}$ | 74 | — |
| 11 | PAS | T-7 | 5 | $4.3 \times 10^{11}$ | 1.5 | $4.1 \times 10^{11}$ | 99 | — |
| 12 | ABS | T-7 | 5 | $6.2 \times 10^{10}$ | 1.0 | $8.5 \times 10^{10}$ | 100 | — |
| 13 | ABS | T-13 | 5 | $3.1 \times 10^{10}$ | <1 | $4.6 \times 10^{10}$ | 99 | — |
| 14 | PSt | T-13 | 5 | $1.3 \times 10^{11}$ | 1.1 | $2.2 \times 10^{11}$ | 91 | — |
| 15 | PMMA | T-6 | 3 | $5.2 \times 10^{11}$ | 1.3 | $1.3 \times 10^{11}$ | 100 | 15.8 |
| 16 | PMMA | T-8 | 10 | $7.3 \times 10^{12}$ | 2.3 | $2.1 \times 10^{11}$ | 95 | 1.0 |
| 17 | PMMA | T-9 | 7 | $6.8 \times 10^{12}$ | 2.5 | $3.1 \times 10^{12}$ | 97 | 1.0 |
| 18 | PMMA | T-10 | 5 | $1.2 \times 10^{10}$ | <1 | $8.9 \times 10^{9}$ | 99 | 2.5 |
| 19 | PMMA | T-11 | 3 | $2.3 \times 10^{10}$ | <1 | $3.2 \times 10^{10}$ | 100 | 8.0 |
| 20 | PMMA | T-12 | 5 | $9.3 \times 10^{10}$ | 1.0 | $6.3 \times 10^{10}$ | 100 | 1.2 |

TABLE 4-continued

| Example No. | Kind of thermoplastic resin (A) | Copolymer (B) Kind | Copolymer (B) Amount (parts) | Surface resistance value ($\Omega$) | Charge half-value time (seconds) | Surface resistance value after water washing treatment ($\Omega$) | HDT (°C.) | Haze value (%) |
| --- | --- | --- | --- | --- | --- | --- | --- | --- |
| 21 | PMMA | T-1 | 3 | $7.2 \times 10^{10}$ | <1 | $5.3 \times 10^{10}$ | 100 | 23 |

EXAMPLES 22 THROUGH 34

Various monomers were prepared in the same manner as described in Example 4 except that sulfonic acid-containing monomers and quaternary phosphonium base shown in Table 5 were used.

TABLE 5

| Monomer No. | Sulfonic acid-containing monomer | Quaternary phosphonium-base |
| --- | --- | --- |
| M-6 | Allylsulfonic acid | Tetraethylphosphonium hydroxide |
| M-7 | Sulfoethyl methacrylate | Benzyltriethylphosphonium hydroxide |
| M-8 | Styrenesulfonic acid | Tetrabutylphosphonium hydroxide |

By using monomers M-2 and M-6 through M-8, various antistatic property-imparting copolymers(T-14 through T-22) were prepared in the same manner as described in Example 4 except that the kinds of the copolymerized monomers and the copolymerization amounts were changed as shown in Table 6.

TABLE 6

| Antistatic property-imparting polymer No. | Sulfonic acid-containing monomer Kind | Sulfonic acid-containing monomer Copolymerization amount (%) | Copolymerized monomer Kind | Copolymerized monomer Copolymerization amount (%) | Copolymerized monomer Kind | Copolymerized monomer Copolymerization amount (%) |
| --- | --- | --- | --- | --- | --- | --- |
| T-14 | M-6 | 50 | E23AM | 50 | — | — |
| T-15 | M-7 | 50 | MMA | 50 | — | — |
| T-16 | M-8 | 50 | Styrene | 50 | — | — |
| T-17 | M-2 | 20 | E9MAM | 80 | — | — |
| T-18 | M-2 | 34 | E23MAM | 66 | — | — |
| T-19 | M-2 | 66 | E23MAM | 34 | — | — |
| T-20 | M-2 | 80 | E500MA | 20 | — | — |
| T-21 | M-2 | 40 | E23MAM | 40 | MMA | 20 |
| T-22 | M-2 | 50 | E23MAM | 30 | Styrene | 20 |

Note
The abbreviations are the same as in Table 3.

The obtained antistatic property-imparting polymer (antistatic polymer) in an amount shown in Table 7 was mixed with 100 parts of a thermoplastic resin shown in Table 7, and the resin composition was pelletized by an extruder under the same conditions as described in Example 1 and the pellet was injection-molded to a plate having a size of 10 cm × 10 cm × 2 mm. Moisture conditioning was carried out at a temperature of 20° C. and a relative humidity of 65% for 1 day, and the antistatic property and other properties were evaluated. With respect to methyl methacrylate polymer resins, also the transparency was also evaluated. The results are shown in Table 7.

TABLE 7

| Example No. | Kind of thermoplastic resin (A) Kind | Copolymer (B) Kind | Copolymer (B) Amount (parts) | Surface resistance value ($\Omega$) | Charge half-value time (seconds) | Surface resistance value after water washing treatment ($\Omega$) | HDT (°C.) | Haze value (%) |
| --- | --- | --- | --- | --- | --- | --- | --- | --- |
| 22 | PET | T-14 | 6 | $5.3 \times 10^{11}$ | 2.0 | $4.2 \times 10^{11}$ | — | — |
| 23 | PVC | T-15 | 5 | $3.4 \times 10^{12}$ | 8.5 | $2.5 \times 10^{12}$ | 74 | — |
| 24 | PAS | T-16 | 5 | $8.7 \times 10^{11}$ | 2.5 | $9.2 \times 10^{11}$ | 99 | — |
| 25 | ABS | T-16 | 5 | $1.2 \times 10^{11}$ | 1.7 | $4.3 \times 10^{11}$ | 100 | — |
| 26 | ABS | T-22 | 5 | $6.8 \times 10^{10}$ | 1.0 | $5.3 \times 10^{10}$ | 99 | — |
| 27 | PSt | T-22 | 5 | $1.2 \times 10^{11}$ | 1.1 | $2.0 \times 10^{11}$ | 91 | — |
| 28 | PMMA | T-15 | 3 | $8.2 \times 10^{11}$ | 1.4 | $3.5 \times 10^{11}$ | 100 | 10.5 |
| 29 | PMMA | T-17 | 10 | $2.3 \times 10^{12}$ | 5.3 | $7.1 \times 10^{11}$ | 95 | 1.0 |
| 30 | PMMA | T-18 | 7 | $1.3 \times 10^{12}$ | 2.4 | $2.0 \times 10^{12}$ | 97 | 1.0 |
| 31 | PMMA | T-19 | 5 | $2.3 \times 10^{11}$ | 1.2 | $1.2 \times 10^{11}$ | 99 | 1.8 |
| 32 | PMMA | T-20 | 3 | $2.2 \times 10^{11}$ | 1.2 | $1.4 \times 10^{11}$ | 100 | 3.0 |
| 33 | PMMA | T-21 | 5 | $5.3 \times 10^{11}$ | 1.3 | $2.4 \times 10^{11}$ | 100 | 1.2 |
| 34 | PMMA | T-2 | 3 | $4.3 \times 10^{11}$ | 1.2 | $2.3 \times 10^{11}$ | 100 | 20 |

Note
The abbreviations are the same as in Table 4.

EXAMPLE 35

To 100 parts of a polyethylene terephthalate resin was added 8 parts of the antistatic property-imparting copolymer(T-5) obtained in Example 9, and the resin composition was pelletized under the same conditions as described in Example 1. The pellet was shaped into a film having a width of about 300 mm and a thickness of 100 μm. Moisture conditioning was carried out at a temperature of 20° C. and a relative humidity of 65% for 1 day, and the antistatic property of the film was evaluated. It was found that the surface resistance value was $5.6 \times 10^{10}$ Ω and the charge half-value time was 1.1 seconds.

The obtained film was subjected to the water washing treatment and the antistatic property thereof was immediately evaluated. It was found that the surface resistance value was $7.2 \times 10^{10}$ Ω.

COMPARATIVE EXAMPLES 1 THROUGH 6

The physical properties of thermoplastic resins, in which an antistatic property-imparting polymer was not incorporated, were evaluated. Pelletization and molding were carried out in the same manner as described in Example 1. The results are shown in Table 8.

TABLE 8

| Comparative Example No. | Kind of thermoplastic resin | Surface resistance value (Ω) | Charge half-value time (seconds) | Surface resistance value (Ω) after water washing treatment | HDT (°C.) |
| --- | --- | --- | --- | --- | --- |
| 1 | PSt | >$10^{15}$ | ∞ | >$10^{15}$ | 92 |
| 2 | PAS | >$10^{15}$ | ∞ | >$10^{15}$ | 100 |
| 3 | PVC | >$10^{15}$ | ∞ | >$10^{15}$ | 75 |
| 4 | PMMA | >$10^{16}$ | ∞ | >$10^{16}$ | 100 |
| 5 | ABS | >$10^{15}$ | ∞ | >$10^{15}$ | 99 |
| 6 | PET | >$10^{15}$ | ∞ | >$10^{15}$ | — |

Note: The abbreviations are the same as in Table 4.

COMPARATIVE EXAMPLE 7

Into 100 parts by weight of a methyl methacrylate polymer resin was incorporated 50 parts of the antistatic property-imparting copolymer(T-3) obtained in Example 3, the resin composition was extruded and pelletized under the same conditions as described in Example 3, and the pellet was injection-molded to a plate having a size of 10 cm×10 cm×2 mm. Moisture conditioning was carried out at a temperature of 20° C. and a relative humidity of 65% for 1 day, and the antistatic property and other properties of the plate were evaluated. The results are shown in Table 9.

TABLE 9

| Surface resistance value (Ω) | Charge half-value time (seconds) | Surface resistance value after water washing treatment (Ω) | Haze value (%) | HDT (°C.) |
| --- | --- | --- | --- | --- |
| <$10^9$ | <1 | <$10^9$ | 35 | 80 |

As seen from the data shown in Table 9, if the amount of the antistatic property-imparting polymer added was 50 parts by weight per 100 parts by weight of the methyl methacrylate polymer resin, the antistatic property was good, but the haze value was increased and the transparency lost. It also was found that, in this case, the mechanical properties of the methacrylic resin were poor.

COMPARATIVE EXAMPLES 8 AND 9

By using the monomer(M-1) as the anionic monomer, the antistatic property-imparting copolymers(T-23) and (T-24) shown in Table 10 were prepared in the same manner as described in Example 3.

TABLE 10

| antistatic copolymer | Anionic monomer | | Copolymerized monomer | | Copolymerized monomer | |
| --- | --- | --- | --- | --- | --- | --- |
| | Kind | Amount (parts) | Kind | Amount (parts) | Kind | Amount (parts) |
| T-23 | M-1 | 10 | E23MAM | 90 | — | — |
| T-24 | M-1 | 10 | E23MAM | 10 | MMA | 80 |

Note: The abbreviations are the same as in Table 3.

The antistatic property-imparting copolymer shown in Table 10 was incorporated in an amount shown in Table 11 into 100 parts of a methyl methacrylate polymer resin, the resin composition was pelletized by an extruder in the same manner as described in Example 3, and injection-molded into a plate having a size of 10 cm×10 cm×2 mm. Moisture conditioning was carried out at a temperature of 20° C. and a relative humidity of 65% for 1 day, and the antistatic property and haze were measured. The results are shown in Table 11. In the antistatic property-imparting copolymers of Comparative Examples 8 and 9, since the content of the anionic monomer was too low, no antistatic property could be manifested even if the amounts of the antistatic property-imparting copolymers were increased.

TABLE 11

| Comparative Example No. | Antistatic polymer | | Surface resistance value (Ω) | Charge half-value time (seconds) | Surface resistance value after water washing treatment (Ω) | Haze value (%) |
| --- | --- | --- | --- | --- | --- | --- |
| | Kind | Amount (parts) | | | | |
| 8 | T-23 | 30 | $3.2 \times 10^{14}$ | ∞ | $1.6 \times 10^{14}$ | <2 |
| 9 | T-24 | 30 | $4.5 \times 10^{15}$ | ∞ | $7.2 \times 10^{15}$ | <2 |

COMPARATIVE EXAMPLE 10

In 100 parts of a methyl methacrylate polymer resin was incorporated 10 parts of glycerol monostearate (low-molecular-weight surface active agent), and the mixture was pelletized by an extruder. Under the same conditions as described in Example 3, the pellet was injection-molded to form a plate having a size of 10 cm×10 cm×2 mm. Moisture conditioning was carried out at a temperature of 20° C. and a relative humidity of 65% for 1 day, and the antistatic property of the plate was evaluated. It was found that the surface resistivity was $8.2 \times 10^{11}$ Ω and the charge half-value time was 3.5 seconds.

The obtained plate was subjected to the water washing treatment and the antistatic property was immediately evaluated. It was found that the surface resistivity was $1.8 \times 10^{15}$ Ω and the charge half-value time was longer than 1 minute. Accordingly, it was confirmed that the antistatic property of the resin composition of this comparative example had no resistance to water washing. It also was found that the HDT was 71° C.

COMPARATIVE EXAMPLE 11

A methyl methacrylate polymer resin plate having a size of 10 cm × 10 cm × 2 mm was immersed in a 1.5% aqueous solution of a coating type antistatic agent having a quaternary ammonium salt group (Staticide supplied by Analytical Chemical Laboratories) for 1 minute and then air-dried. Moisture conditioning was carried out at a temperature of 20° C. and a relative humidity of 65% for 1 day, and the antistatic property was evaluated. It was found that the surface resistivity was $1.2 \times 10^9$ Ω and the charge half-value period was shorter than 1 second.

The obtained plate was subjected to the water washing treatment and the antistatic property was immediately evaluated. It was found that the surface resistivity was $5.6 \times 10^{15}$ Ω and the charge half-value time was longer than 2 minutes. It was confirmed that the plate had no durable antistatic property.

COMPARATIVE EXAMPLE 12

A 3-liter glass flask equipped with stirring vanes was charged with 312.4 parts of 2-acrylamido-2-methylpropanesulfonic acid and 450 parts of methanol, and a mixture of 102.8 parts of 25% aqueous ammonia and 240 parts of methanol was added dropwise with violent stirring so that the temperature was maintained below 30° C. After the dropwise addition, the mixture was stirred for 30 minutes to obtain a solution of an anionic monomer(M-9), 3.2 parts of azobisisobutyronitrile, 2.4 parts of n-octylmercaptan, 30 parts of methanol and 360 parts of polyethylene glycol(23) monomethacrylate monomethyl ether were then added to the anionic monomer(M-9) solution, and a polymerization was carried out at 60° C. for 4 hours in a nitrogen atmosphere. The polymerization reaction mixture was directly vacuum-dried to obtain an antistatic property-imparting polymer(T-25).

In 100 parts of a methyl methacrylate resin were incorporated 6 parts of the antistatic property-imparting polymer(T-25) and 0.05 part of triphenyl phosphite, and the obtained resin composition was pelletized by an extruder. The obtained pellet was injection-molded into a plate having a size of 10 cm × 10 cm × 2 mm. Silver streaks were formed on the plate, and yellowing occurred.

From the results of this comparative example, it is seen that, if $R_2$ through $R_5$ of the counter cation in general formula (I) are hydrogen atoms, the resistance to thermal deterioration is poor.

The resin composition of the present invention has a good and durable antistatic property, wherein the inherent physical properties, such as heat resistance and strength, of the base polymer are not lowered. Accordingly, the occurrence of static electricity problems often arising in the fields of molded articles, films, sheets and fibers, such as the attraction of dirt and dust and spoiling of the appearance does not occur. Therefore, the resin composition of the present invention can be used even for electronics-related fields wherein a high reliability is required.

We claim:

1. An antistatic thermoplastic resin composition comprising (A) 100 parts by weight of a thermoplastic resin and (B) 0.1 to 40 parts by weight of a homopolymer or copolymer comprising 20 to 100% by weight of units derived from an anionic monomer represented by the following general formula (I):

$$CH_2=\overset{R_1}{\underset{|}{C}}-A_1-SO_3^-X^+R_2R_3R_4R_5 \qquad (I)$$

wherein $R_1$ represents a hydrogen atom or a methyl group, $A_1$ represents

in which n is 0 or an integer of 1 or 2,

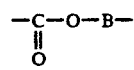

in which B represents an alkylene, arylene or aralkylene group having 1 to 18 carbon atoms which may have an ester bond, or

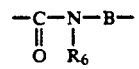

in which B is as defined above and $R_6$ represents a hydrogen atom or an alkyl group having 1 to 5 carbon atoms, or $A_1$ is

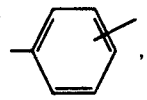

X represents a nitrogen atom or a phosphorous atom, and $R_2$, $R_3$, $R_4$ and $R_5$ independently represent an alkyl, aryl or aralkyl group having 1 to 18 carbon atoms, and 80 to 0% by weight of units derived from a vinyl monomer or vinylidene monomer copolymerizable with said anionic monomer, wherein the number average molecular weight of the homopolymer or copolymer (B) is at least 1,000.

2. An antistatic thermoplastic resin composition as set forth in claim 1, wherein X in general formula (I) is a nitrogen atom.

3. An antistatic thermoplastic resin composition as set forth in claim 1, wherein the copolymer (B) comprises 20 to 99% by weight of units derived from the anionic monomer represented by general formula (I) and 80 to 1% by weight of units derived from the vinyl monomer or vinylidene monomer copolymerizable therewith.

4. An antistatic thermoplastic resin composition as set forth in claim 1, wherein the units of the copolymerizable vinyl monomer or vinylidene monomer are the same as the monomer units constituting the thermoplastic resin (A) or the same as monomer units forming a resin having a good compatibility with the thermoplastic resin (A).

5. An antistatic thermoplastic resin composition as set forth in claim 1, wherein the copolymer (B) comprises 20 to 90% by weight of units derived from the anionic monomer represented by general formula (I), 10 to 80% by weight of units derived from a copolymerizable monomer having a polyalkylene glycol component and 0 to 70% by weight of units derived from the copolymerizable vinyl monomer.

6. An antistatic thermoplastic resin composition as set forth in claim 5, wherein the copolymerizable monomer having a polyalkylene glycol component is represented by the following general formula (II):

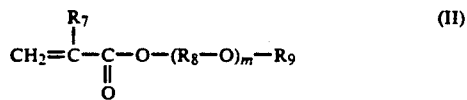

(II)

wherein $R_7$ represents a hydrogen atom or a methyl group, $R_8$ represents an alkylene group having 1 to 4 carbon atoms, $R_9$ represents a hydrogen atom or an alkyl group having 1 to 20 carbon atoms, and m is an integer of from 1 to 500.

7. An antistatic thermoplastic resin composition as set forth in claim 1, wherein the thermoplastic resin (A) and the homopolymer or copolymer (B) are mixed together and molded in the heat-melted state.

8. An antistatic thermoplastic resin composition as set forth in claim 6, wherein in the copolymer (B), the weight ratio of units derived from the anionic monomer represented by general formula (I) to units of the copolymerizable monomer having a polyalkylene glycol component, represented by general formula (II), is in the range of from 1 to 4/1.

9. An antistatic thermoplastic resin composition as set forth in claim 8, wherein said weight ratio is in the range of from 1 to 2/1.

10. An antistatic thermoplastic resin composition as set forth in claim 1, which further comprises a phosphite antioxidant.

11. An antistatic thermoplastic resin composition as set forth in claim 1, wherein the thermoplastic resin (A) is polystyrene.

12. An antistatic thermoplastic resin composition as set forth in claim 1, wherein the thermoplastic resin (A) is a styrene/acrylonitrile copolymer.

13. An antistatic thermoplastic resin composition as set forth in claim 1, wherein the thermoplastic resin (A) is an ABS resin.

14. An antistatic thermoplastic resin composition as set forth in claim 1, wherein the thermoplastic resin (A) is polyvinyl chloride.

15. An antistatic thermoplastic resin composition as set forth in claim 1, wherein the thermoplastic resin (A) is a methyl methacrylate polymer.

16. An antistatic thermoplastic resin composition as set forth in claim 1, wherein the thermoplastic resin (A) is a polyethylene terephthalate polymer.

* * * * *